United States Patent
Miao et al.

(10) Patent No.: US 10,787,905 B2
(45) Date of Patent: Sep. 29, 2020

(54) KNIFE HOLDER AND BASE SYSTEM FOR MILLING MACHINE

(71) Applicant: KAITO SUZHOU CONSTRUCTION MACHINERY CO.,LTD, Suzhou (CN)

(72) Inventors: Xiang Miao, Suzhou (CN); Pengcheng Qin, Suzhou (CN)

(73) Assignee: KAITO SUZHOU CONSTRUCTION MACHINERY CO., LTD., Suzhou (CN)

( * ) Notice: Subject to any disclaimer, the term of this patent is extended or adjusted under 35 U.S.C. 154(b) by 109 days.

(21) Appl. No.: 16/153,839

(22) Filed: Oct. 8, 2018

(65) Prior Publication Data

US 2019/0039154 A1 Feb. 7, 2019

Related U.S. Application Data

(63) Continuation of application No. PCT/CN2017/086959, filed on Jun. 2, 2017.

(30) Foreign Application Priority Data

Dec. 27, 2016 (CN) .......................... 2016 1 1224292

(51) Int. Cl.
| | |
|---|---|
| E21C 35/18 | (2006.01) |
| E21C 35/19 | (2006.01) |
| B23C 5/26 | (2006.01) |
| B23C 5/22 | (2006.01) |
| E01C 23/088 | (2006.01) |
| E21C 35/193 | (2006.01) |

(52) U.S. Cl.
CPC ............ *E21C 35/18* (2013.01); *E21C 35/191* (2020.05); *B23C 5/22* (2013.01); *B23C 5/26* (2013.01);
(Continued)

(58) Field of Classification Search
CPC ............... E21C 35/193; E21C 35/1933; E21C 35/1936; E21C 35/18; E21C 35/19;
(Continued)

(56) References Cited

U.S. PATENT DOCUMENTS

| | | | | |
|---|---|---|---|---|
| 4,542,943 A | * | 9/1985 | Montgomery, Jr. | .. E02F 9/2866 299/102 |
| 4,609,227 A | * | 9/1986 | Wild | ....................... E21C 35/18 299/103 |

(Continued)

FOREIGN PATENT DOCUMENTS

| | | |
|---|---|---|
| CN | 105133480 A | 12/2015 |
| CN | 106087683 A | 11/2016 |

(Continued)

OTHER PUBLICATIONS

Internation Search Report of PCT/CN2017/086959, dated Sep. 26, 2017.

*Primary Examiner* — David J Bagnell
*Assistant Examiner* — Michael A Goodwin
(74) *Attorney, Agent, or Firm* — Buchanan Ingersoll & Rooney PC

(57) ABSTRACT

The present invention belongs to the technical field of milling machines, and mainly relates to a novel cutter holder and base system for a milling machine. The cutter holder and base system according to the present invention aims to solve the problems in the prior art that a cutter holder structure is unreasonable, the cutting force of a cutter cannot be well dispersed in the cutter holder and a base, so that the service lives of the cutter holder and the base are shortened. The base is provided with a hole-shaped inner area and two curved surface areas, where the two curved surface areas are disposed in a circumferential area of the hole-shaped inner area, the curved surface areas are arranged at an angle, and each curved surface area includes two curved surfaces. The cutter holder improves its own usage performance while a lighter weight is achieved.

11 Claims, 26 Drawing Sheets

(52) U.S. Cl.
CPC .... *B23C 2210/168* (2013.01); *B23C 2240/24* (2013.01); *B23C 2260/72* (2013.01); *E01C 23/088* (2013.01); *E21C 35/193* (2013.01); *E21C 35/1933* (2013.01)

(58) Field of Classification Search
CPC ... E21C 2035/191; E21C 35/197; B27C 1/00; B27C 1/005; B27C 5/00; B27C 1/007
USPC ............. 299/79.1, 100–113; 144/24.12, 334; 241/294, 296; 407/49, 101
See application file for complete search history.

(56) References Cited

U.S. PATENT DOCUMENTS

| | | | |
|---|---|---|---|
| 2004/0051370 A1* | 3/2004 | Montgomery, Jr. | .. E21C 35/197 299/106 |
| 2008/0093912 A1* | 4/2008 | Willoughby | ............ E21C 35/19 299/107 |
| 2009/0085396 A1* | 4/2009 | Chiang | .................. B28D 1/188 299/102 |
| 2013/0241264 A1* | 9/2013 | Lehnert | .................... E21C 35/18 299/79.1 |
| 2013/0307318 A1* | 11/2013 | Kammerer | ............ E21C 35/193 299/104 |
| 2016/0123144 A1* | 5/2016 | Chiang | .................. E21C 35/193 299/113 |
| 2017/0095943 A1 | 4/2017 | Suzhou | |

FOREIGN PATENT DOCUMENTS

| | | | | |
|---|---|---|---|---|
| CN | 206385437 U | | 8/2017 | |
| DE | 102005010678 A1 | * | 9/2006 | ............ E02F 9/2866 |
| DE | 102011051520 A1 | | 1/2013 | |
| EP | 3248747 A1 | | 11/2017 | |

* cited by examiner

KNIFE HOLDER AND BASE SYSTEM FOR MILLING MACHINE

CROSS-REFERENCE TO RELATED APPLICATIONS

This application is a continuation of International Patent Application No. PCT/CN2017/086959 with a filing date of Jun. 2, 2017, designating the United States, and further claims priority to Chinese Patent Application No. 201611224292.2 with a filing date of Dec. 27, 2016. The content of the aforementioned applications, including any intervening amendments thereto, are incorporated herein by reference.

TECHNICAL FIELD

The present invention belongs to the technical field of milling machines, and mainly relates to a novel cutter (knife) holder and base system for a milling machine.

BACKGROUND

A road milling machine is a maintenance machine for removing road surface diseases. A cutter holder and base system on the milling machine is a milling device which is formed by mounting a plurality of cutter holders on a base body and performing welding to a milling roller. The milling device needs to be replaced when working to the limit. Due to the large number of replacements, the high value, and the difficulty of replacement, there is a need for an optimized cutter holder and base system having a longer service life.

The cutter holder in the existing cutter holder and base system of the milling machine establishes a connection between itself and the base by the pressing force of the bolt, and the butt joint face of the cutter holder and the base is a plane or is in an integrated spherical shape. In the mechanical working process, in the face of ever-changing resistance in all directions, the cutting force cannot be well dispersed into the cutter holder and the base, so that the degree of cooperation between the base and the cutter holder is reduced, the wear is severe, and service lives of the cutter holder and the base are shortened.

SUMMARY

In order to solve the above problems, the present invention discloses a novel cutter holder and base system for a milling machine, which is not only simple in structure, but also has good sealing performance, and can prolong the service lives of a cutter holder and a base.

The objective of the present invention is achieved in this way:

A novel cutter holder and base system for a milling machine includes a cutter holder and a base, where the base is provided with a hole-shaped inner area and two curved surface areas; the two curved surface areas are disposed in a circumferential area of the hole-shaped inner area and are arranged at an angle; and each curved surface area includes two curved surfaces.

The intersection of the two curved surface areas is in transition connection through two transition curved surfaces, and an angle formed by the two curved surface area is 110-120 degrees.

One of the curved surface areas and the inner area are transitionally adjacent to each other through a concave annular groove.

The two curved surfaces of each curved surface area are symmetric with respect to a center line $L_0$ of the inner area.

Tangents of the two curved surfaces of each curved surface area are symmetric with respect to the center line $L_0$ of the inner area, an included angle between the two tangents ranges from 100 degrees to 120 degrees, the radius of the curved surface is in the range of R200-R270, and an offset distance D of a center point O of the curved surface relative to a center line $L_1$ is in the range of 85 mm to 89 mm.

The cutter holder is provided with a first matching curved surface area and a second matching curved surface area which are matched with the two curved surface areas respectively, where the first matching curved surface area is provided with corresponding bearing curved surfaces which support the curved surfaces respectively; and the second matching curved surface area is provided with corresponding bearing curved surfaces which support the curved surfaces respectively.

The cutter holder is provided with a cutter mounting hole extending toward the mounting side and a fixing portion extending toward the supporting side, and the fixing portion is inserted in the inner area.

A central axis of the fixing portion is collinear with a central axis $L_0$ of the inner area, and in a virtual plane A formed by the central axis $L_0$ and a central axis $L_2$ of the cutter mounting hole, the central axis $L_0$ and the central axis $L_2$ form a certain angle ranging from 27 degrees to 30 degrees.

The cutter holder and base system includes a bolt and a lock washer, the fixing portion is provided with an internally threaded hole, and one end of a screw of the bolt passes through a center hole of the lock washer and is screwed into the internally threaded hole of the fixing portion to tightly connect the cutter holder, the lock washer and the base into a whole.

A rubber tail cover is arranged inside the tail of the bolt.

A clamping table is disposed on an inner wall of the inner area of the base, and the clamping table divides the inner area into a hole-shaped chamber for accommodating the fixing portion and a hole-shaped accommodating chamber for accommodating the bolt and the lock washer.

The inner wall of the hole-shaped chamber is provided with two semi-circular grooves, and two semi-circular fixing portion grooves are formed in the corresponding positions of the outer wall of the fixing portion of the cutter holder, the semi-circular grooves are axially parallel to the axis $L_0$ and intersect with the center line $L_1$, and the semi-circular grooves are combined to form complete cylindrical grooves.

The cylindrical groove is provided with a C-shaped swell pin, and each notch of the C-shaped swell pin is toward the inner area, so that the cutter holder and the base are better fixedly connected, and the cutting stress of a cutter is better transmitted to the base through the cutter holder. The C-shaped swell pin guides the cutter holder fixing portion grooves and the base inner hole grooves, to precisely achieve the matching connection between surfaces.

The two cylindrical grooves are an upper column groove and a lower column groove formed up and down, and the upper column groove and the lower column groove are dispersedly symmetrically formed in the diameter direction of the inner area, and the notches of the C-shaped swell pin correspond to the top of the upper column groove and the bottom of the lower column groove respectively.

A rubber seal ring is mounted in the hole-shaped chamber and is provided with a yielding hole through which the fixing portion passes. The fixing portion passes through the central hole of the rubber seal ring and is inserted into the hole-shaped chamber, and the inner wall of the base is closely attached to the fixing portion of the cutter holder through the rubber seal ring.

A dust plug is arranged in a top groove of the base to prevent foreign matter from entering the interior of the base, to protect the cutter holder and base system.

Compared with the prior art, the invention has the following beneficial effects:

1. For the actual use and environmental factors of the product, the cutter holder and the base are of an integral closed structure. Under the action of the dust plug, the rubber tail cover of the bolt and the rubber seal ring, cutting abrasive dust does not enter the internally threaded hole easily, thereby reducing the system failure and damage probability, and facilitating maintenance in the future.

2. The use of the bolt in combination with the lock washer greatly reduces the possibility of bolt looseness compared with conventional no washer which leads to looseness easily.

3. The lightweight design of the cutter holder improves fuel economy while ensuring service life and performance.

4. The cutter holder and the base are fixedly connected, so that the cutting force of the cutter is better transmitted to the base through the cutter holder, and the matching manner of the curved surfaces is adopted to increase the stressed area between the cutter holder and the base from conventionally about 4000 mm$^2$ to approximately 4500 mm$^2$, and the force during cutting of the cutter is better dispersed into the cutter holder and the base, thereby optimizing the service life of the cutter holder and base system and withstanding the impact of stronger forces from all directions.

5. The pre-tightening force of the contact surface of the cutter holder and the base is about 50-55 kN. While this pre-tightening force is ensured, the locking torque of the bolt is reduced to about 250 Nm compared with conventional locking torque of about 500 Nm, which is reduced by a half. In this way, even if during the actual use without electric power and mechanical tools, an operator can achieve the required working torque only by manpower, the working difficulty and strength of the operator are reduced, and the practicality is improved, which conforms to the field work characteristics of the product.

6. In this product, the cutter holder is provided with the internally threaded hole. Since the cutter holder is a wearing part, compared with the conventional forming of the internally threaded hole in the base, the design makes the cutter holder not need to be dismantled and replaced together with the base when an internal thread is damaged due to work or other reasons, and only the cutter holder needs to replaced, which not only greatly reduces the difficulty, strength, cost of maintenance, but more importantly, saves the time required for maintenance, and improves the use efficiency and economic benefit of the product.

The cutter holder fixing portion of the present invention passes through the inner hole of the base, and is locked with the internal thread of the fixed portion of the cutter holder through the bolt and the lock washer, so that the cutter holder is fixedly connected with the base, the cutting stress of the cutter is transmitted to the base better through the cutter holder, and the cutter holder transmits the force to the base; the mode of matching of curved surfaces is used to increase the stressed area between the cutter holder and the base, so that the force during cutting of the cutter is better dispersed into the cutter holder and the base, and thus the service life of the cutter holder and base system is optimized; the cutter holder and the base are supported and connected through different curved surfaces. Compared with an integral spherical design of the base in the prior art, the design enables the cutter holder and the base to withstand impact of stronger force from all directions. The cutter holder of the present invention improves its own usage performance while a lighter weight is achieved.

DESCRIPTION OF EMBODIMENTS

Figure 1:
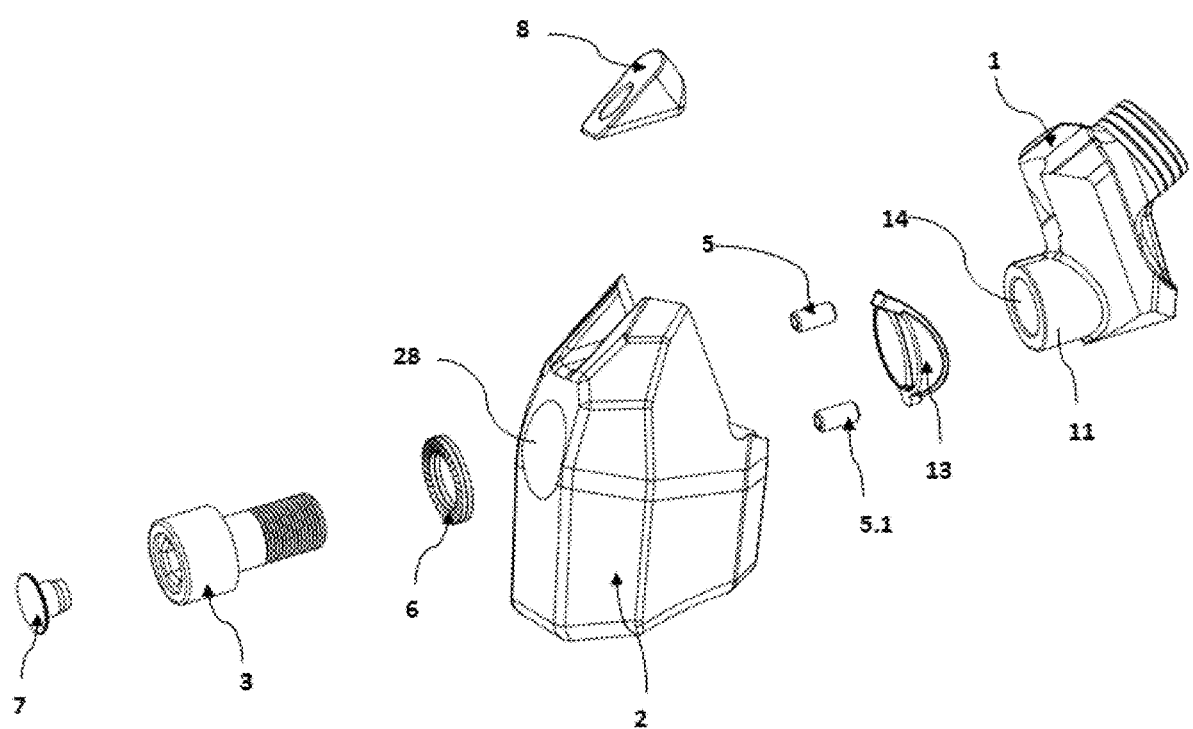
FIG. 1 is a schematic view of an assembly of a cutter holder and a base in an exemplary embodiment of the present invention.
Figure 2:
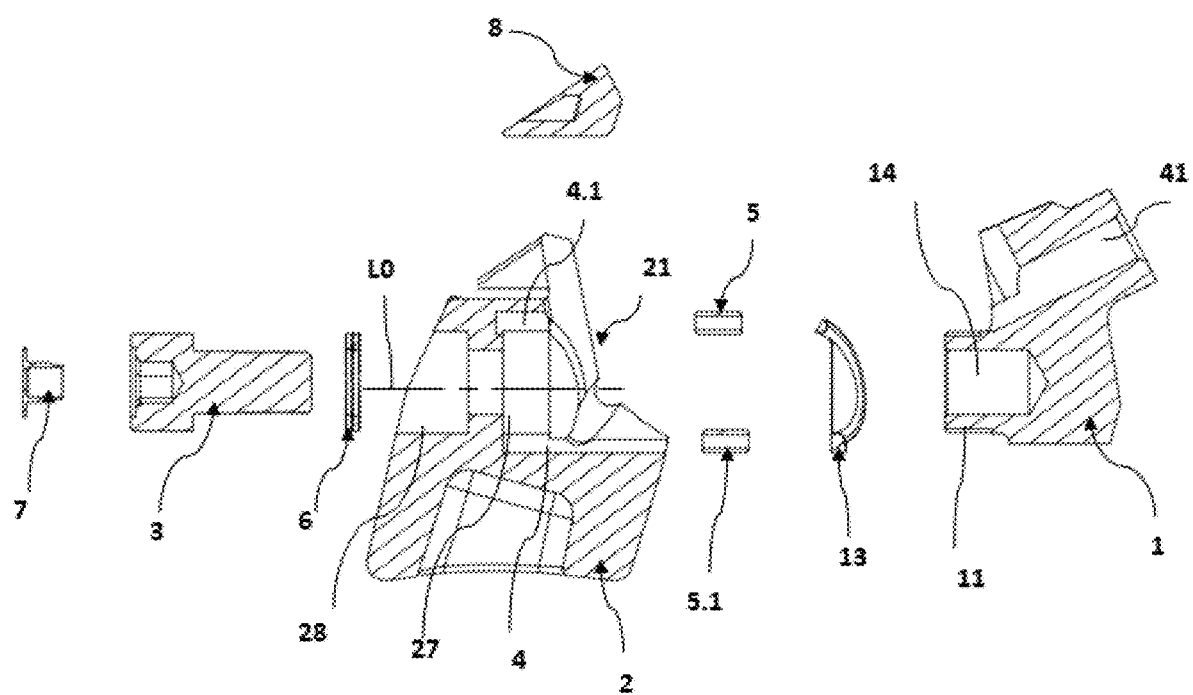
FIG. 2 is a schematic view of a cross-section assembly of a cutter holder and a base in an exemplary embodiment of the present invention.
Figure 3:
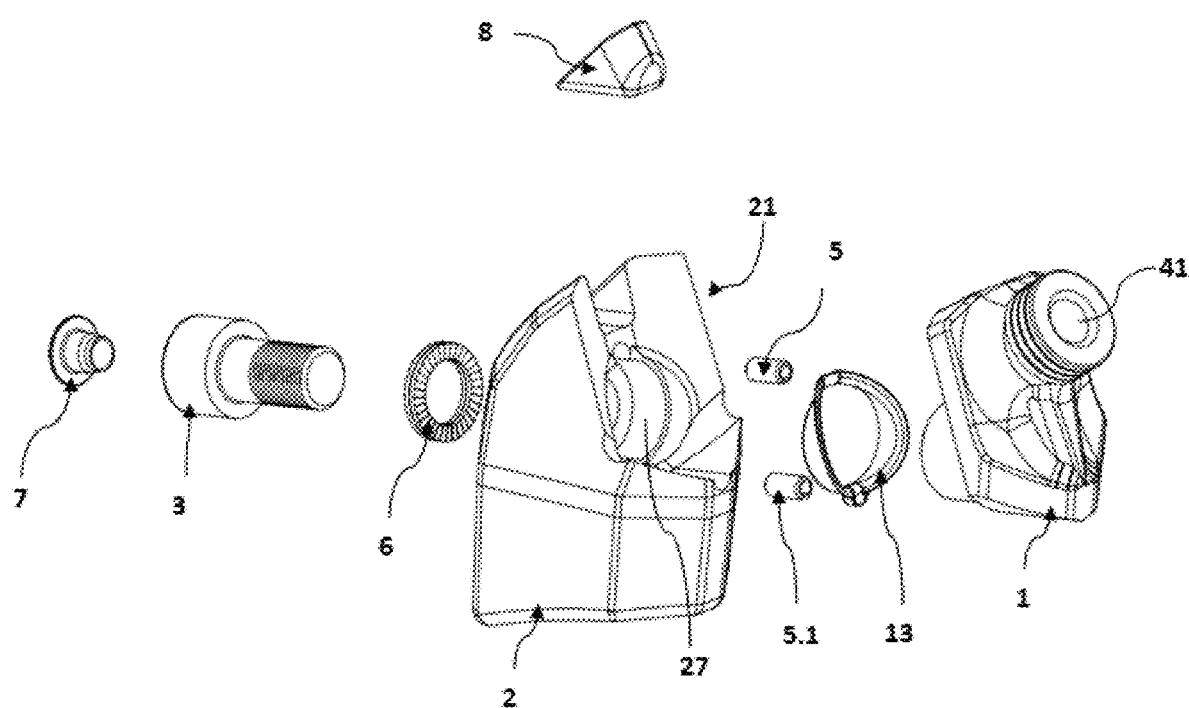
FIG. 3 is a schematic view of a 45-degree assembly of a cutter holder and a base in an exemplary embodiment of the present invention.
Figure 4:
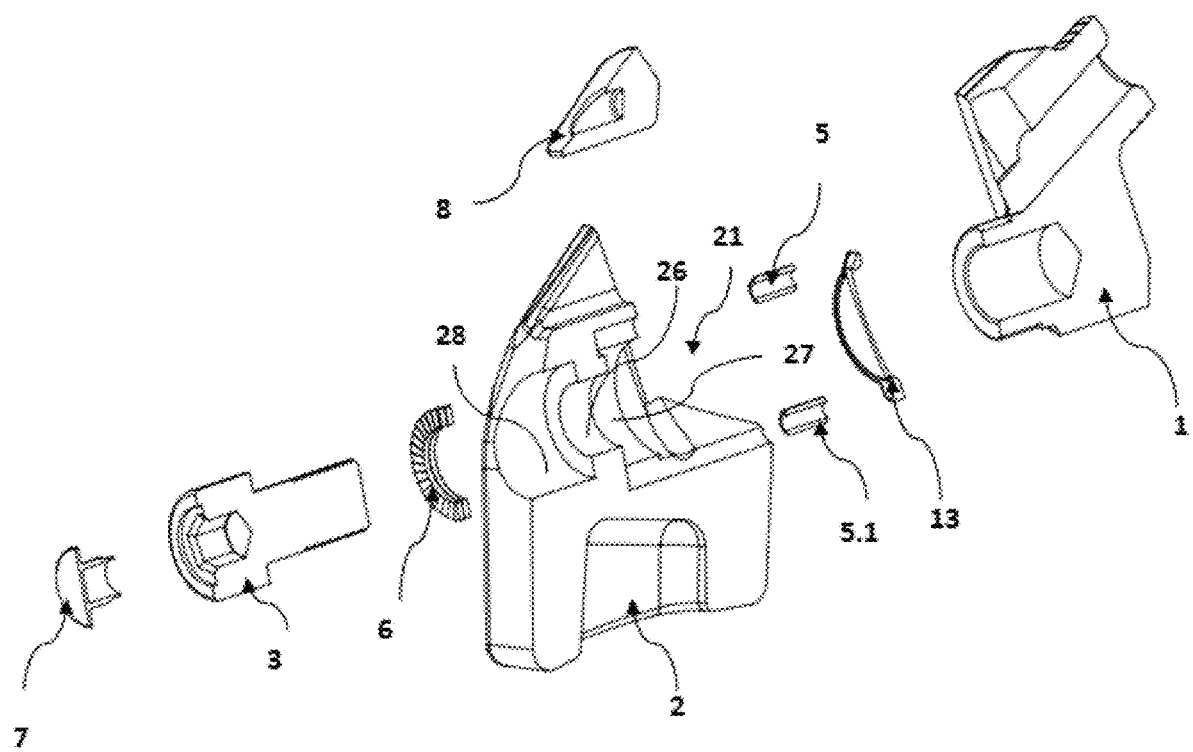
FIG. 4 is a schematic view of a 45-degree cross-section assembly of a cutter holder and a base in an exemplary embodiment of the present invention.
Figure 5:
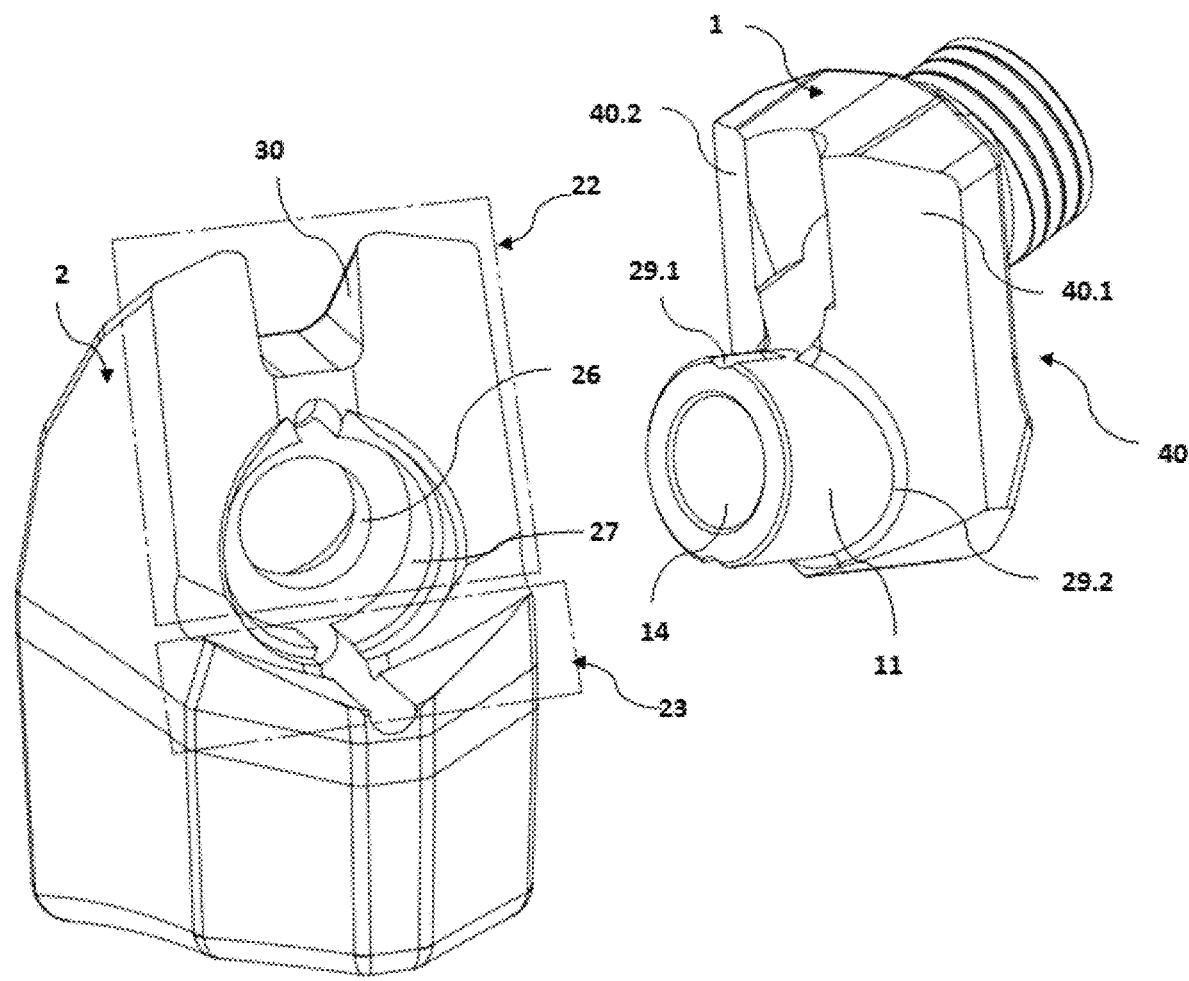
FIG. 5 is a structural schematic view of a cutter holder and a base in an exemplary embodiment of the present invention.
Figure 6:
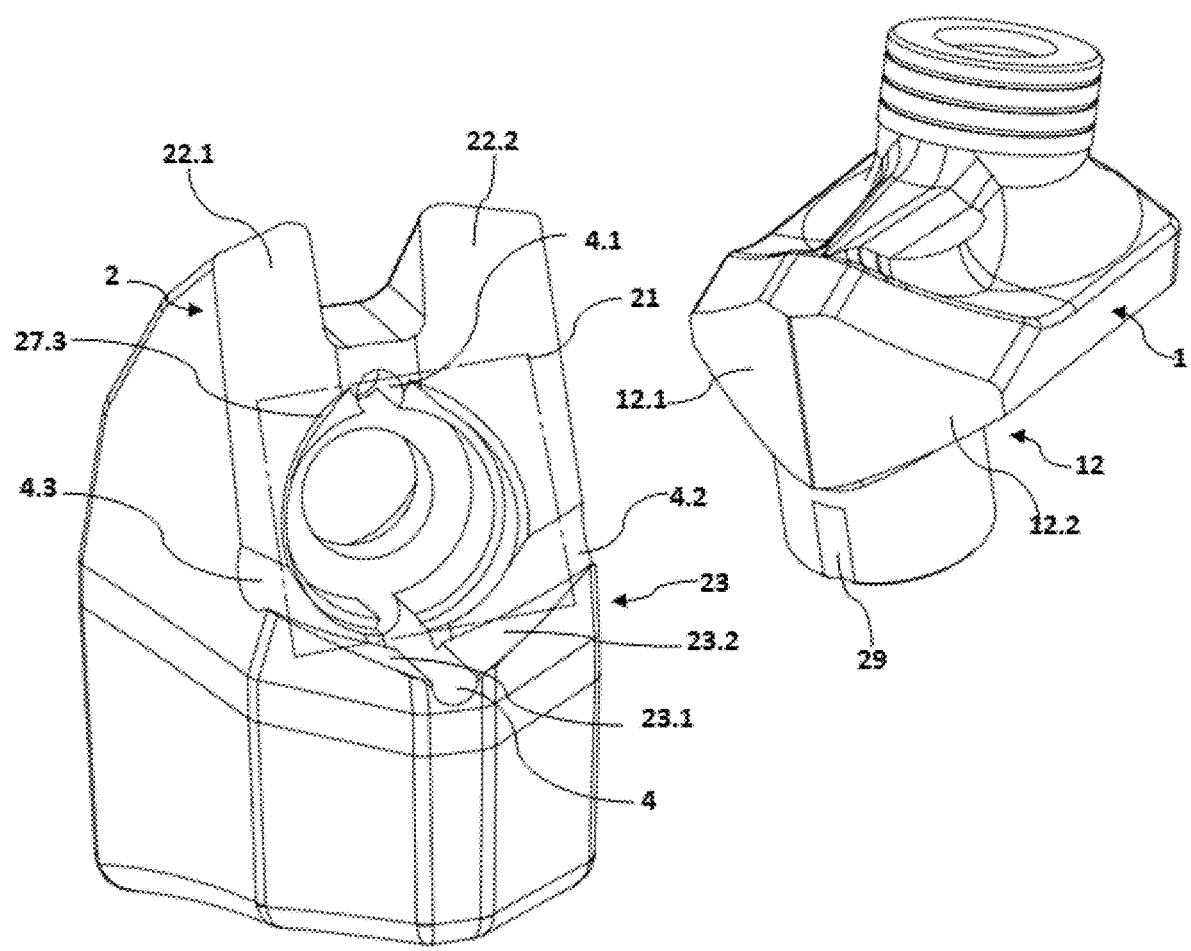
FIG. 6 is a structural schematic view of a curved surface supporting surface of a base and a curved surface faying surface of a cutter holder in an exemplary embodiment of the present invention.
Figure 7:
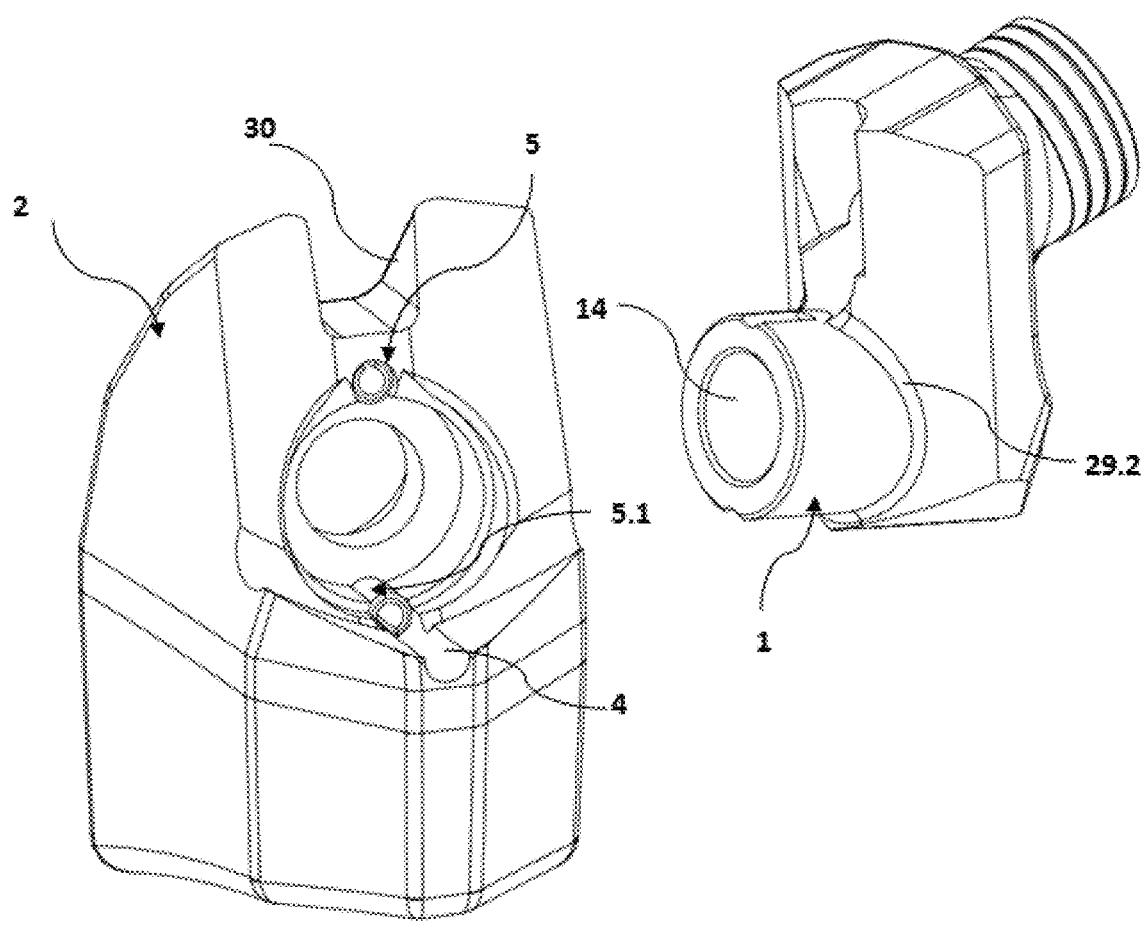
FIG. 7 is a structural schematic view of a cutter holder and a C-shaped swell pin in a base in an exemplary embodiment of the present invention.
Figure 8:
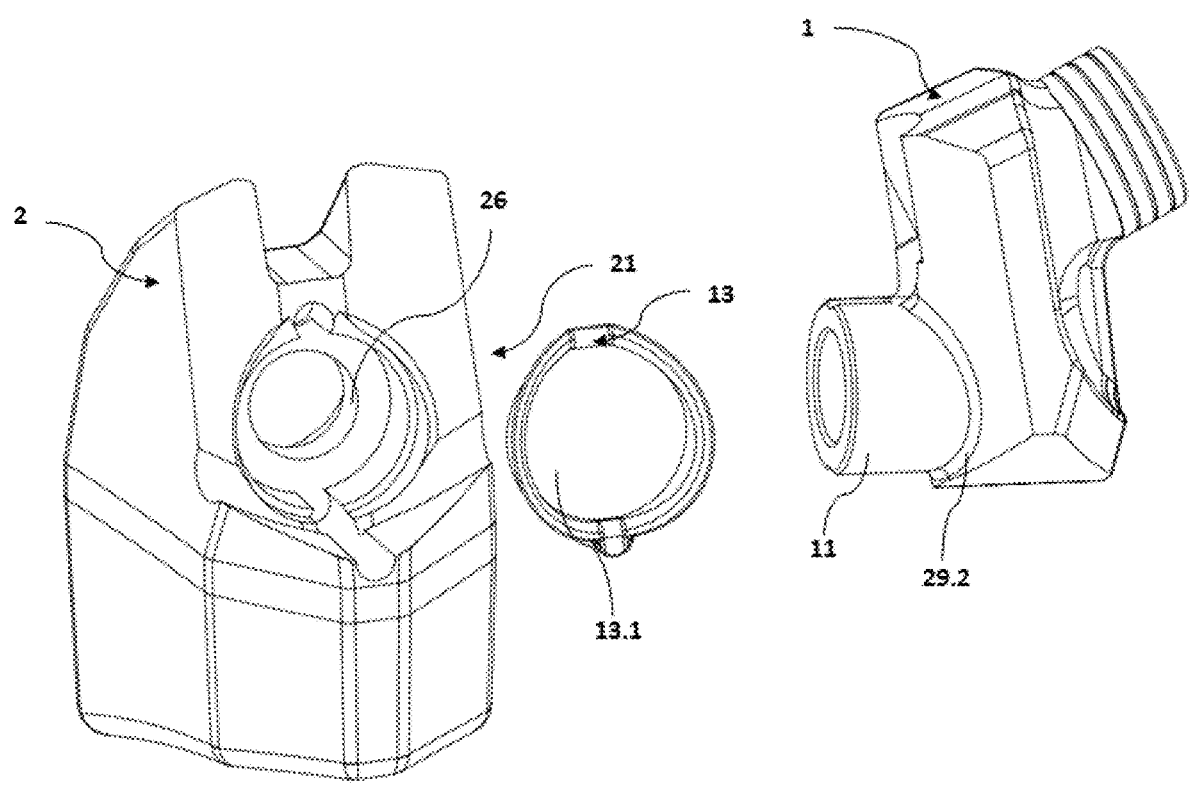
FIG. 8 is a structural schematic view of a base and a rubber seal ring in an exemplary embodiment of the present invention.
Figure 9:
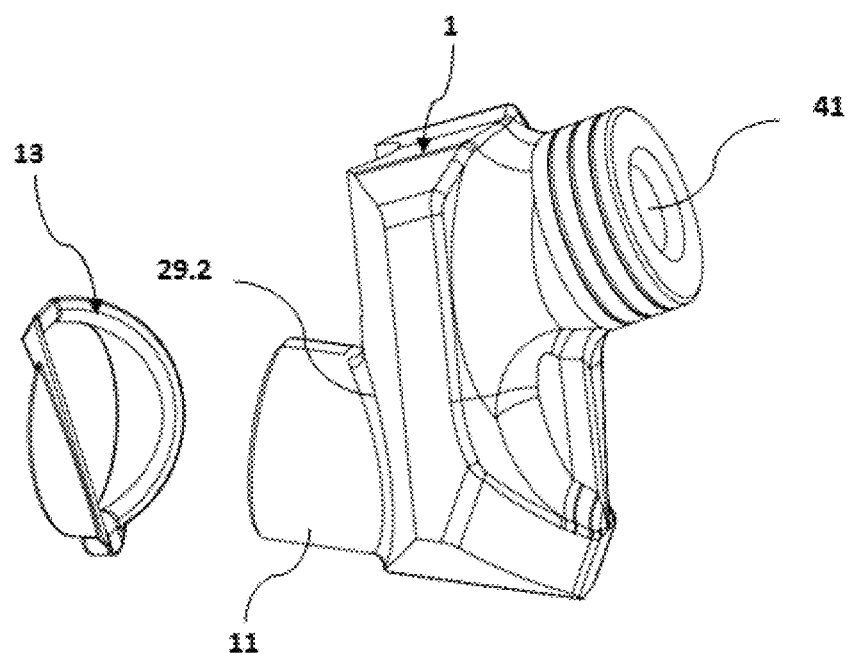
FIG. 9 is a structural schematic view of a cutter holder and a rubber seal ring in an exemplary embodiment of the present invention.
Figure 10:
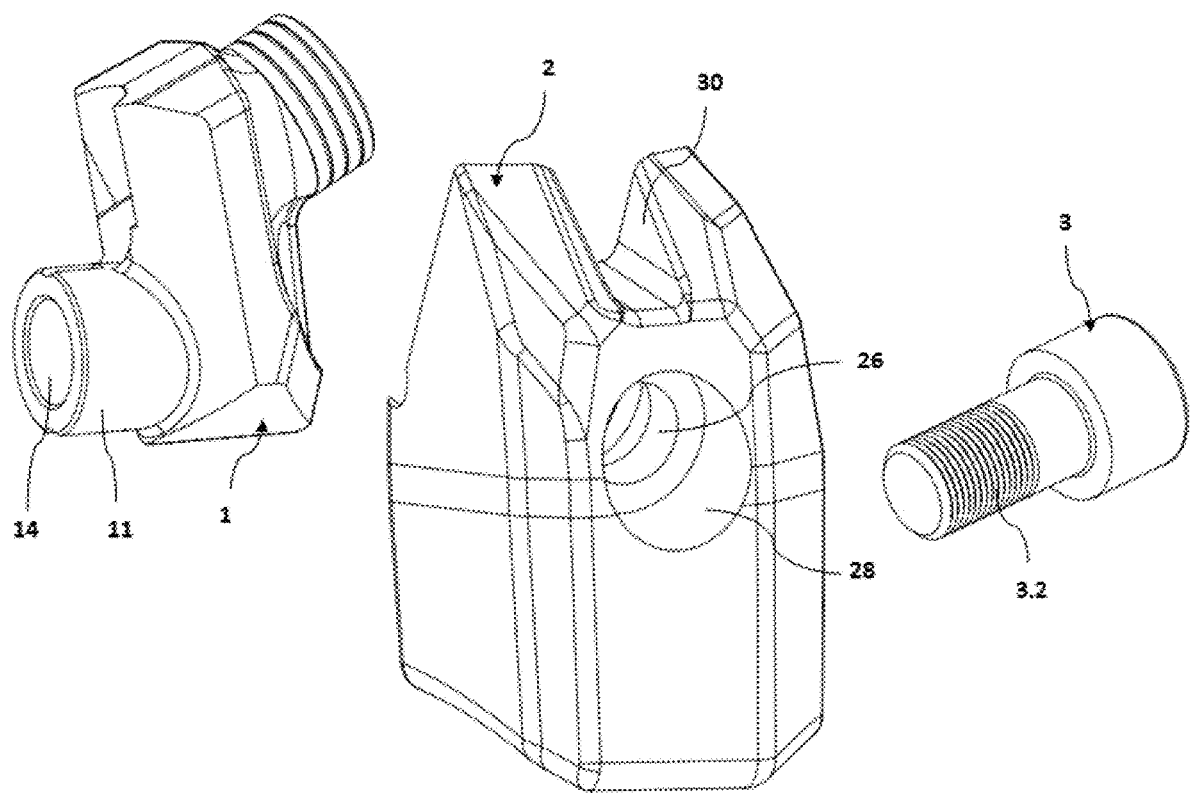
FIG. 10 is a structural schematic view of a base and a bolt in an exemplary embodiment of the present invention.
Figure 11:
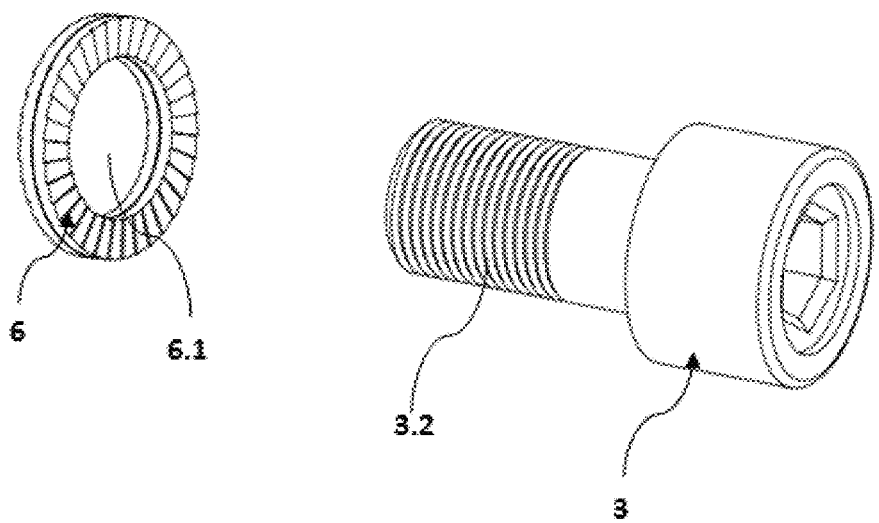
FIG. 11 is a structural schematic view of a bolt and a lock washer in an exemplary embodiment of the present invention.
Figure 12:
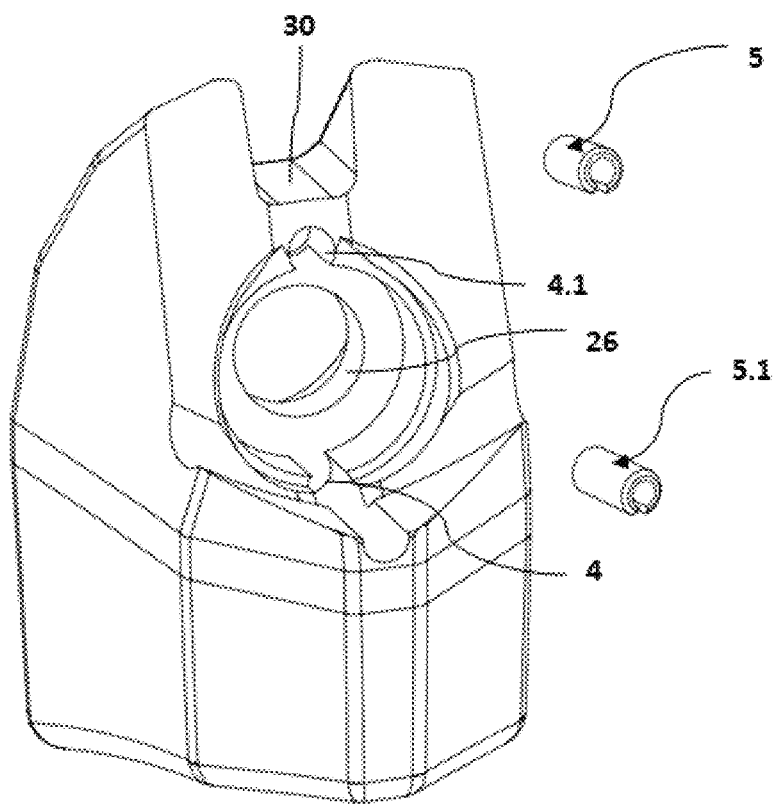
FIG. 12 is a structural schematic view of a base and a C-shaped swell pin in an exemplary embodiment of the present invention.
Figure 13:
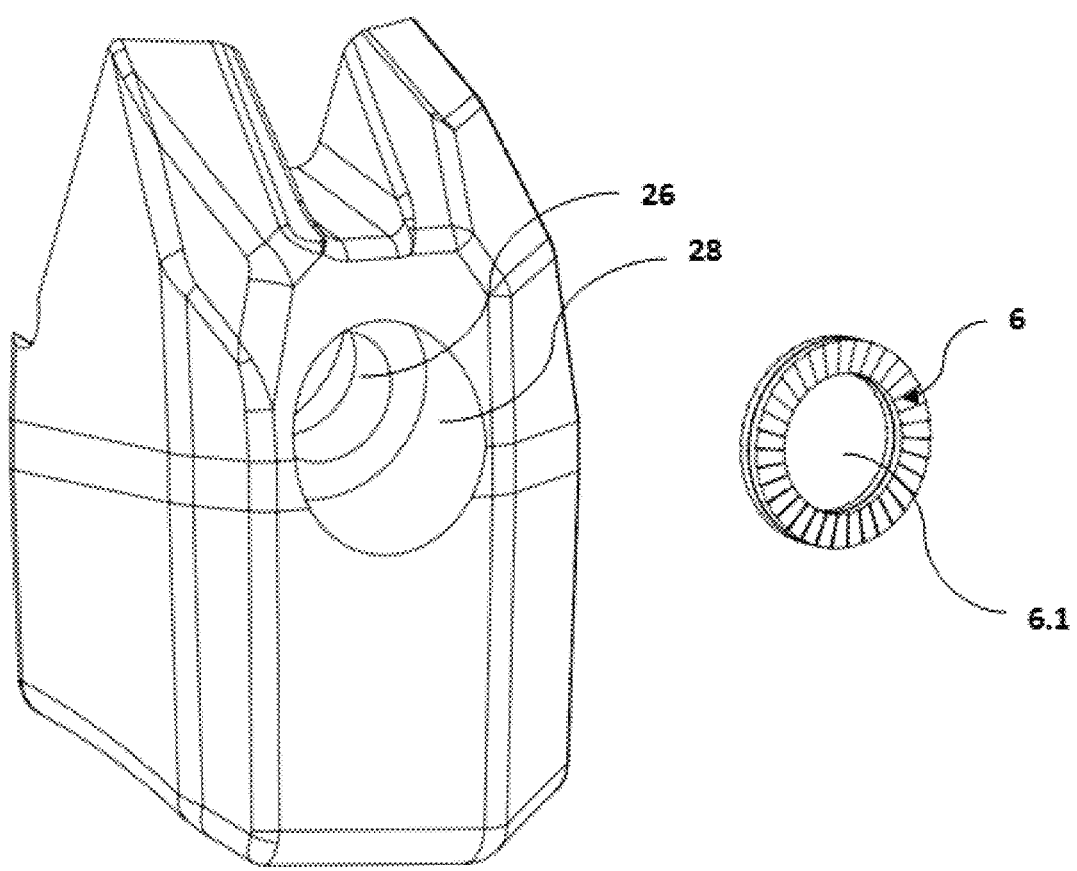
FIG. 13 is a structural schematic view of a base and a lock washer in an exemplary embodiment of the present invention.
Figure 14:
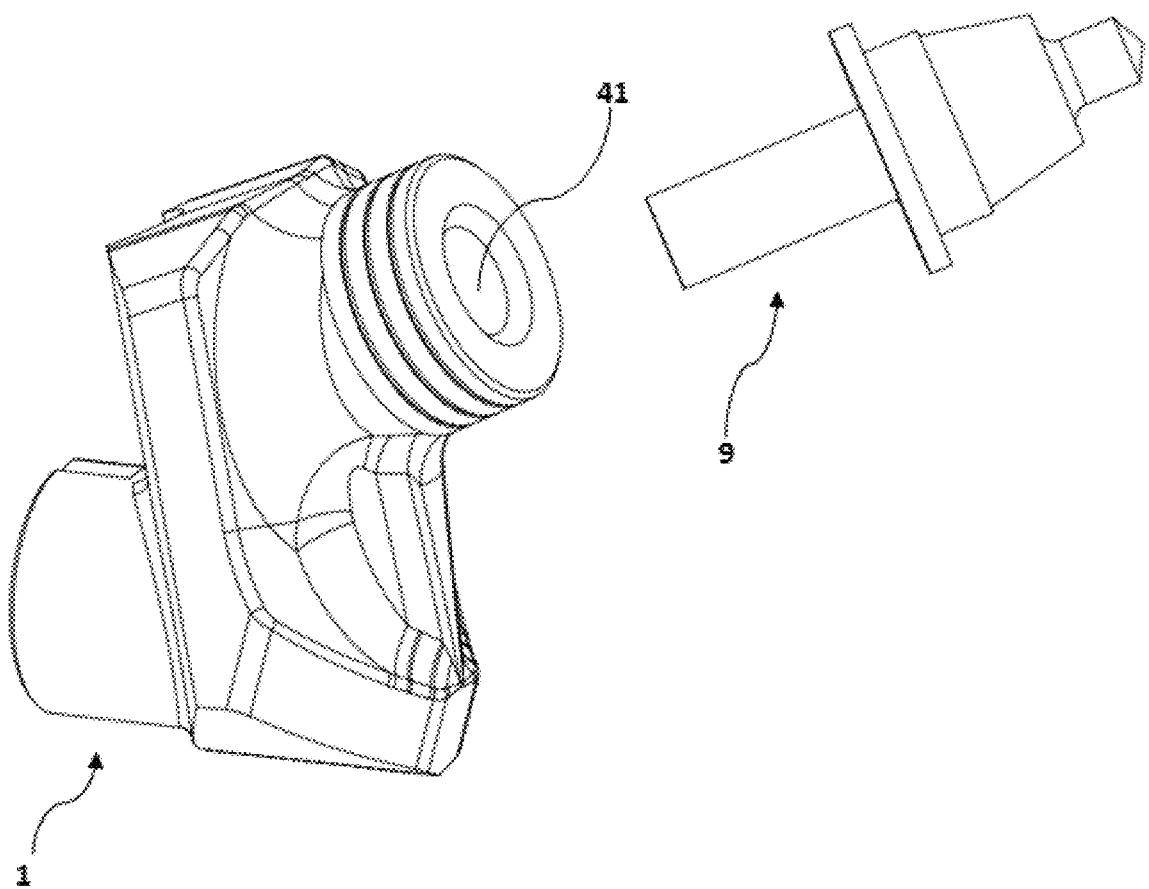
FIG. 14 is a structural schematic view of a cutter holder and a cutting head in an exemplary embodiment of the present invention.
Figure 15:
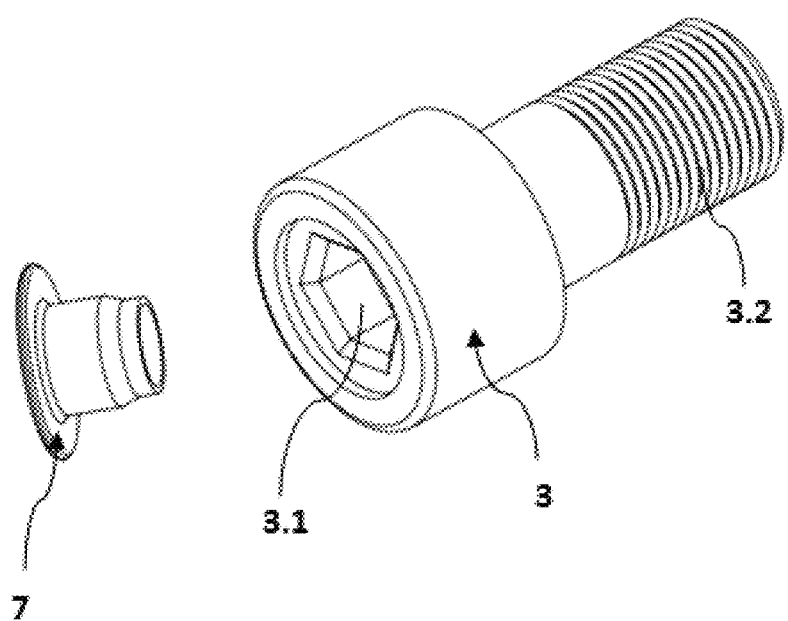
FIG. 15 is a structural schematic view of a bolt and a rubber tail cover in an exemplary embodiment of the present invention.
Figure 16:
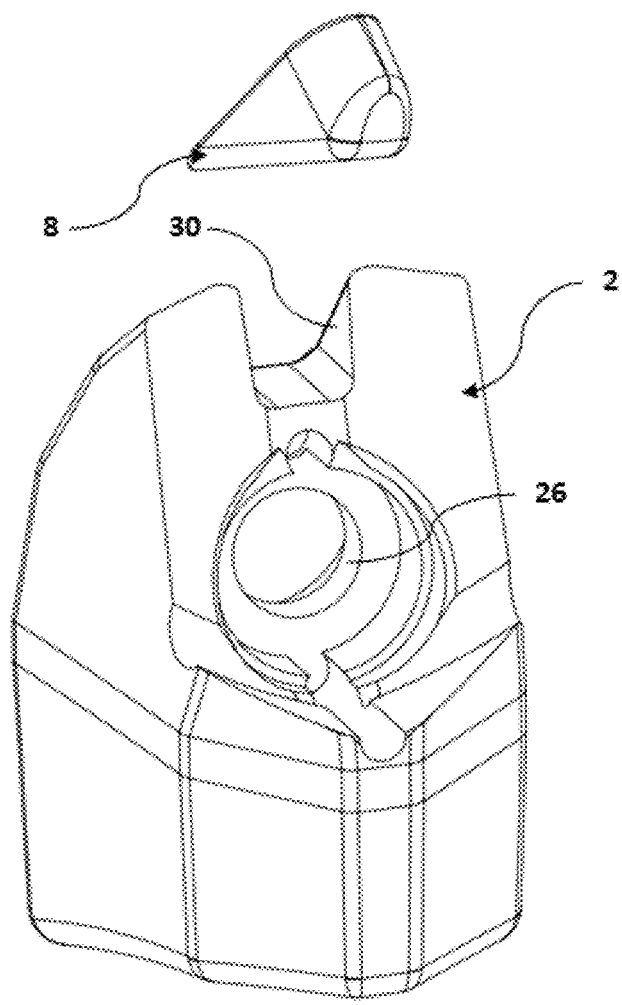
FIG. 16 is a structural schematic view of a base and a dust plug in an exemplary embodiment of the present invention.
Figure 17:
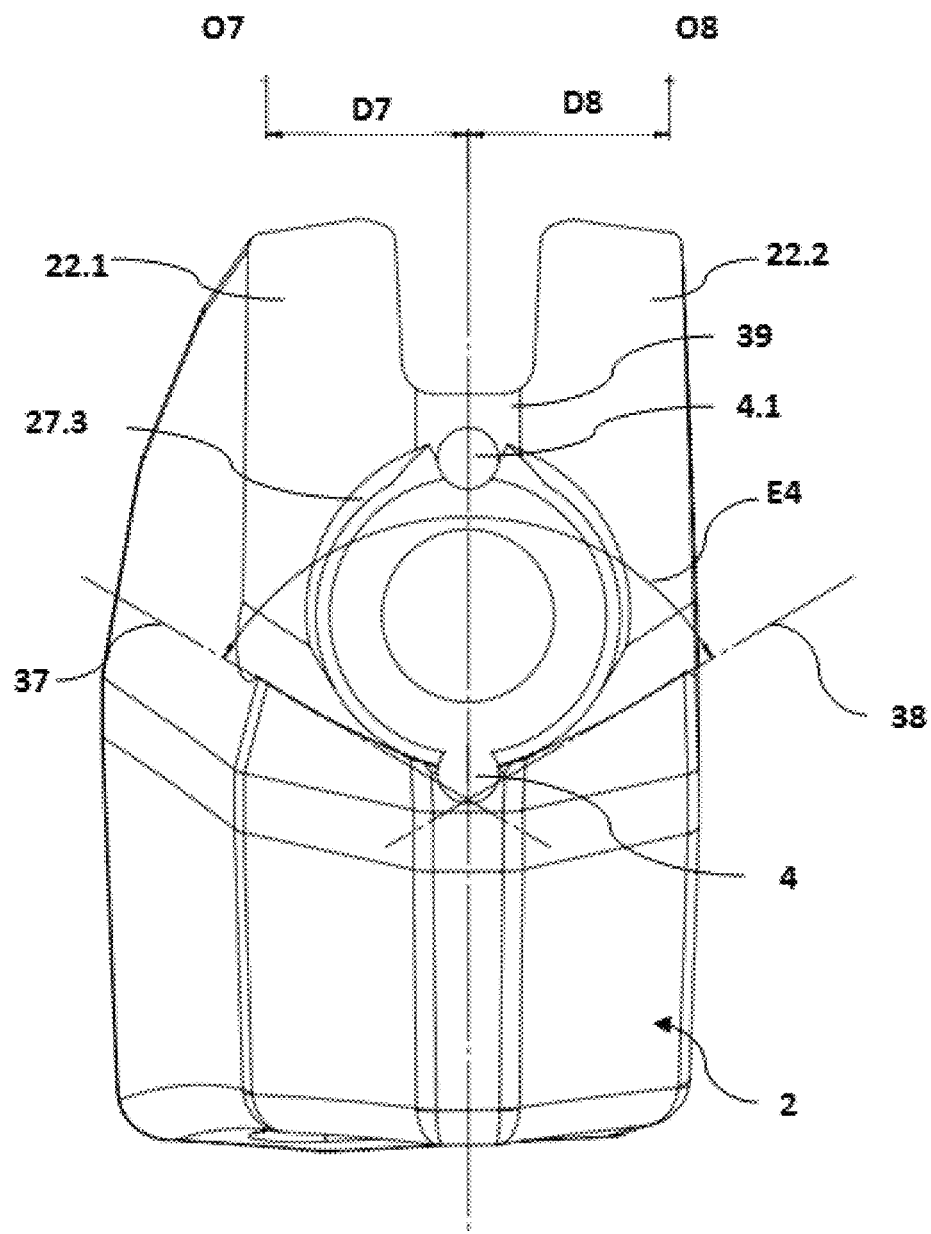
FIG. 17 is a front view of base bearing curved surfaces 22.1 and 22.2 in an exemplary embodiment of the present invention.
Figure 18:
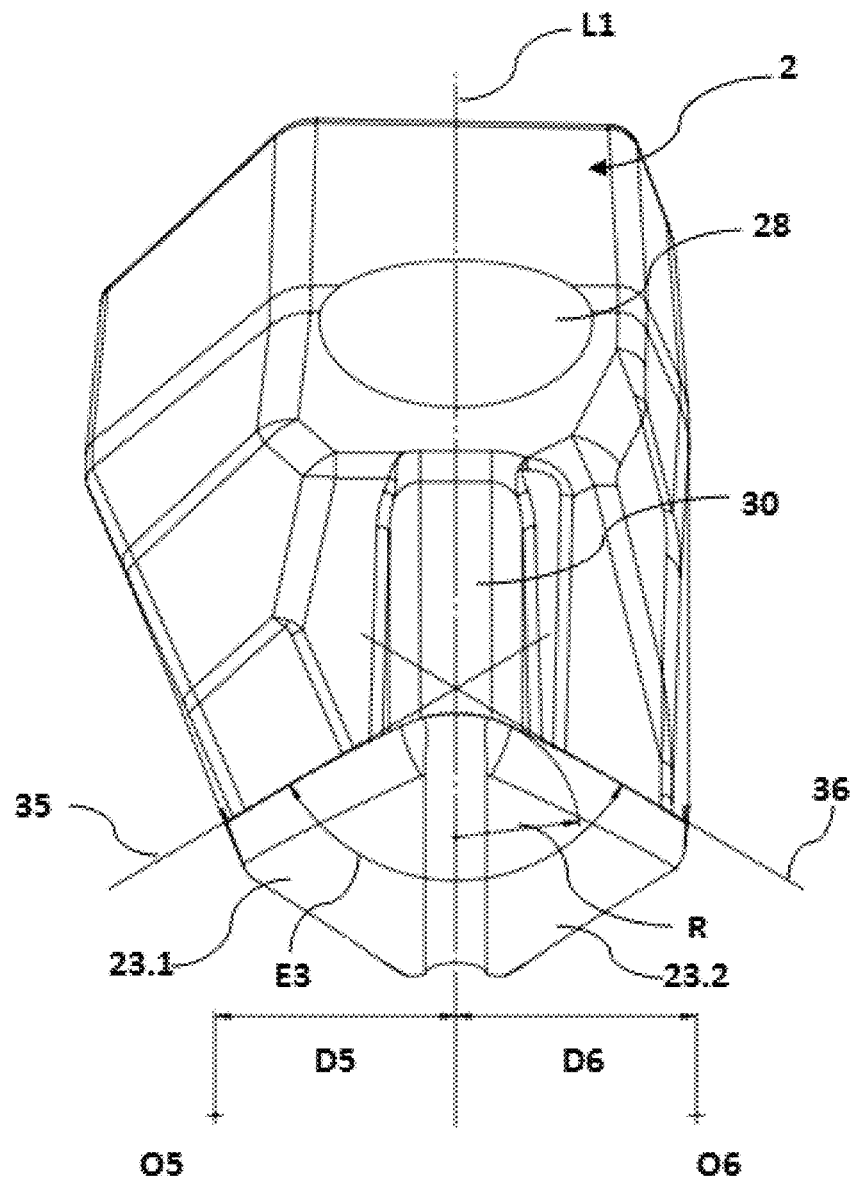
FIG. 18 is a front view of base bearing curved surfaces 23.1 and 23.2 in an exemplary embodiment of the present invention.
Figure 19:
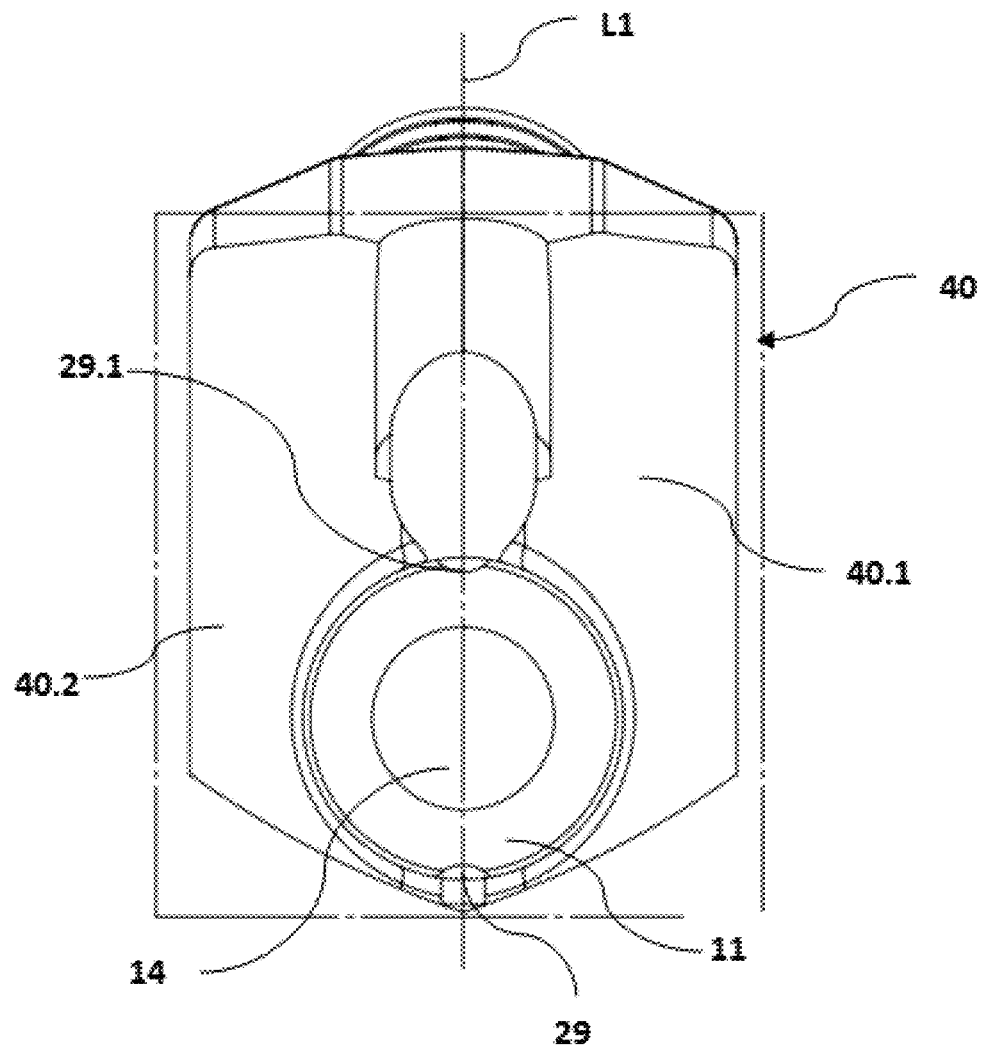
FIG. 19 is a front view of cutter holder matching curved surfaces 40.1 and 40.2 in an exemplary embodiment of the present invention.
Figure 20:
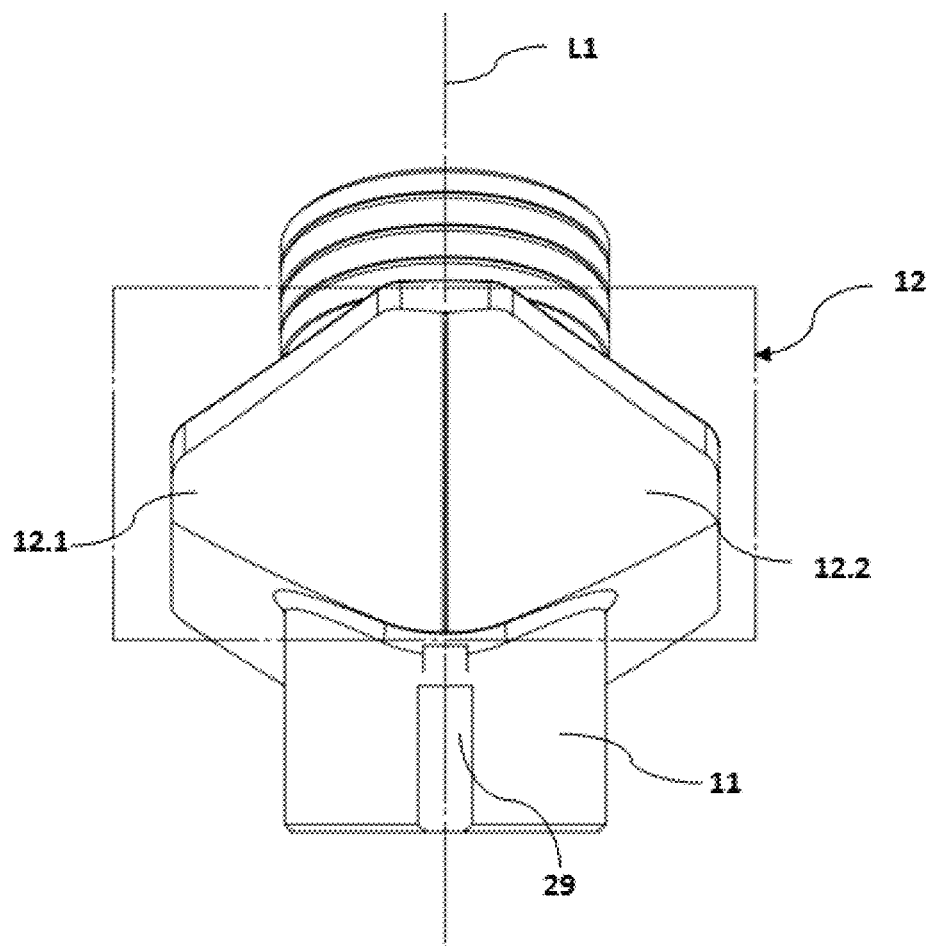
FIG. 20 is a front view of cutter holder bearing curved surfaces 12.1 and 12.2 in an exemplary embodiment of the present invention.
Figure 21:
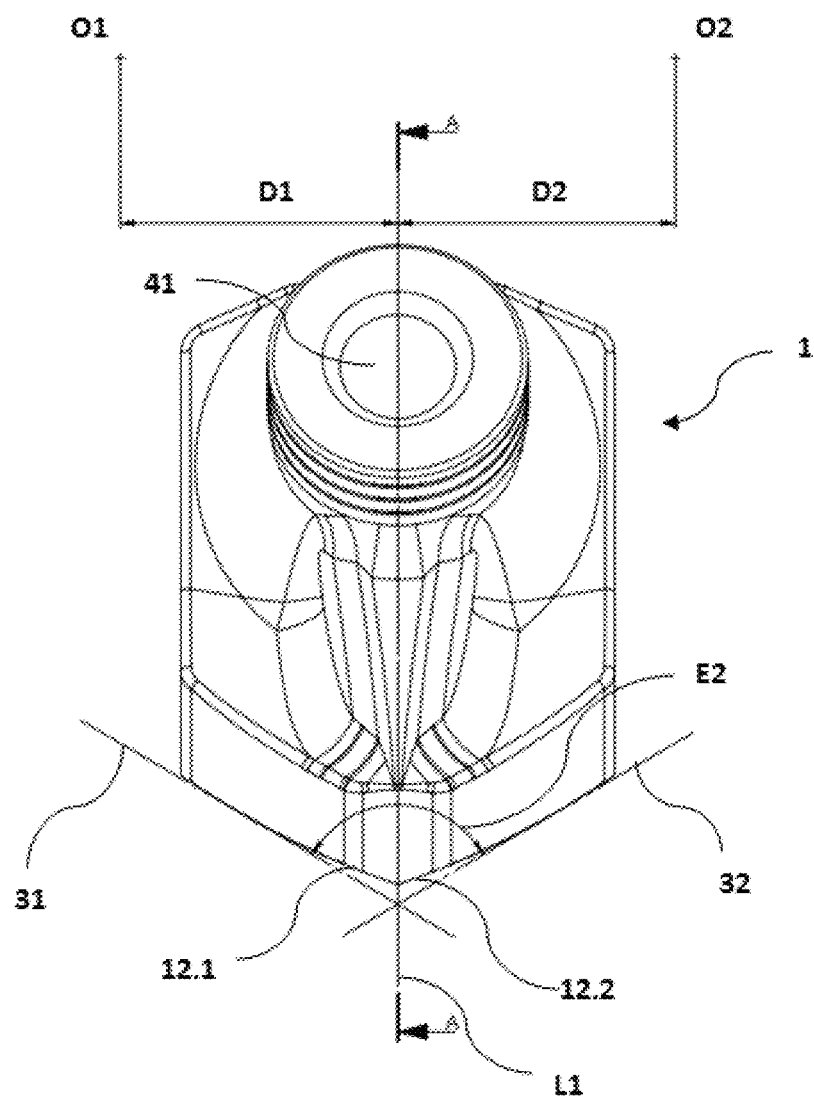
FIG. 21 is a front view of cutter holder matching surface tangents 31 and 32 in an exemplary embodiment of the present invention.
Figure 22:
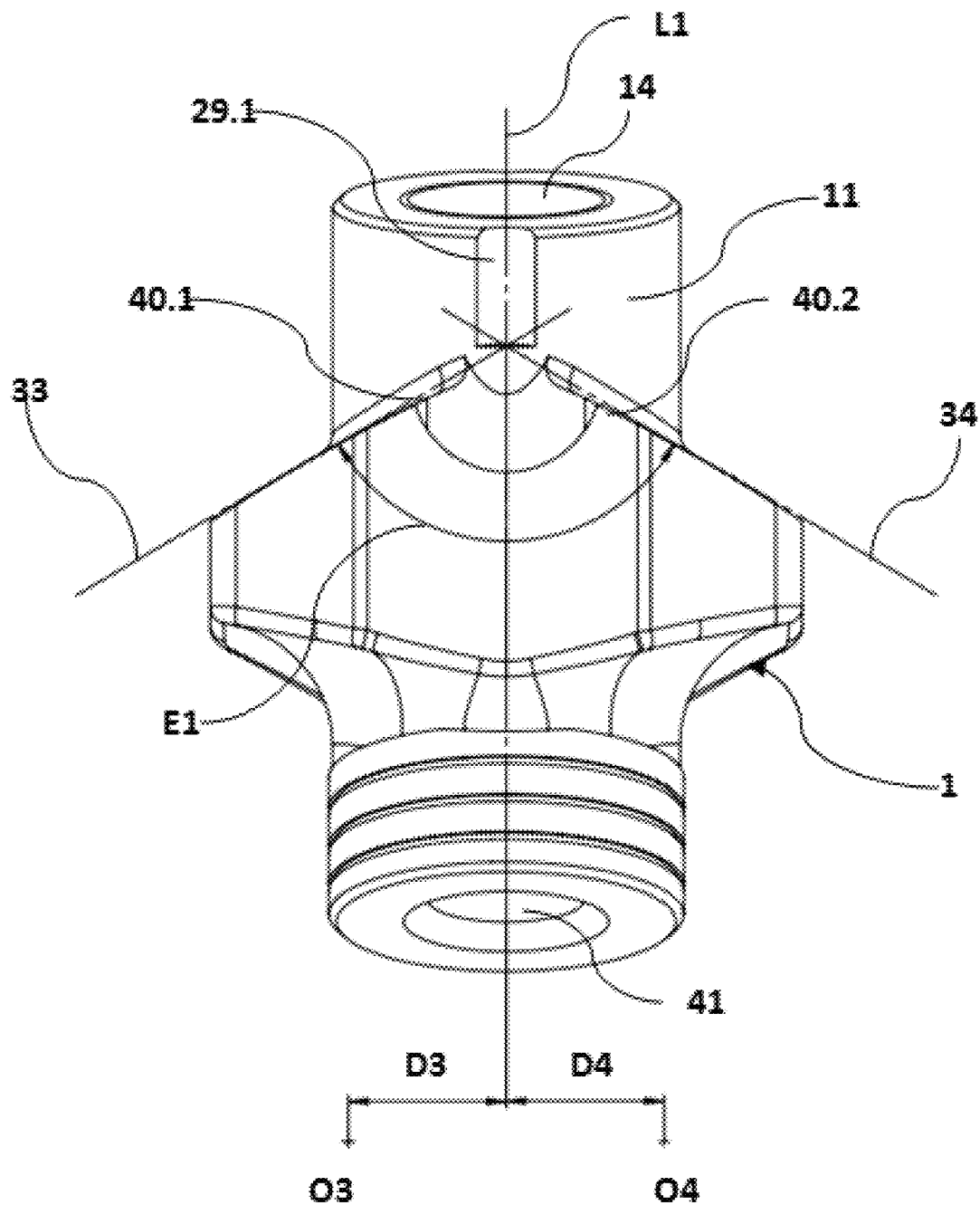
FIG. 22 is a front view of cutter holder matching surface tangents 33 and 34 in an exemplary embodiment of the present invention.
Figure 23:
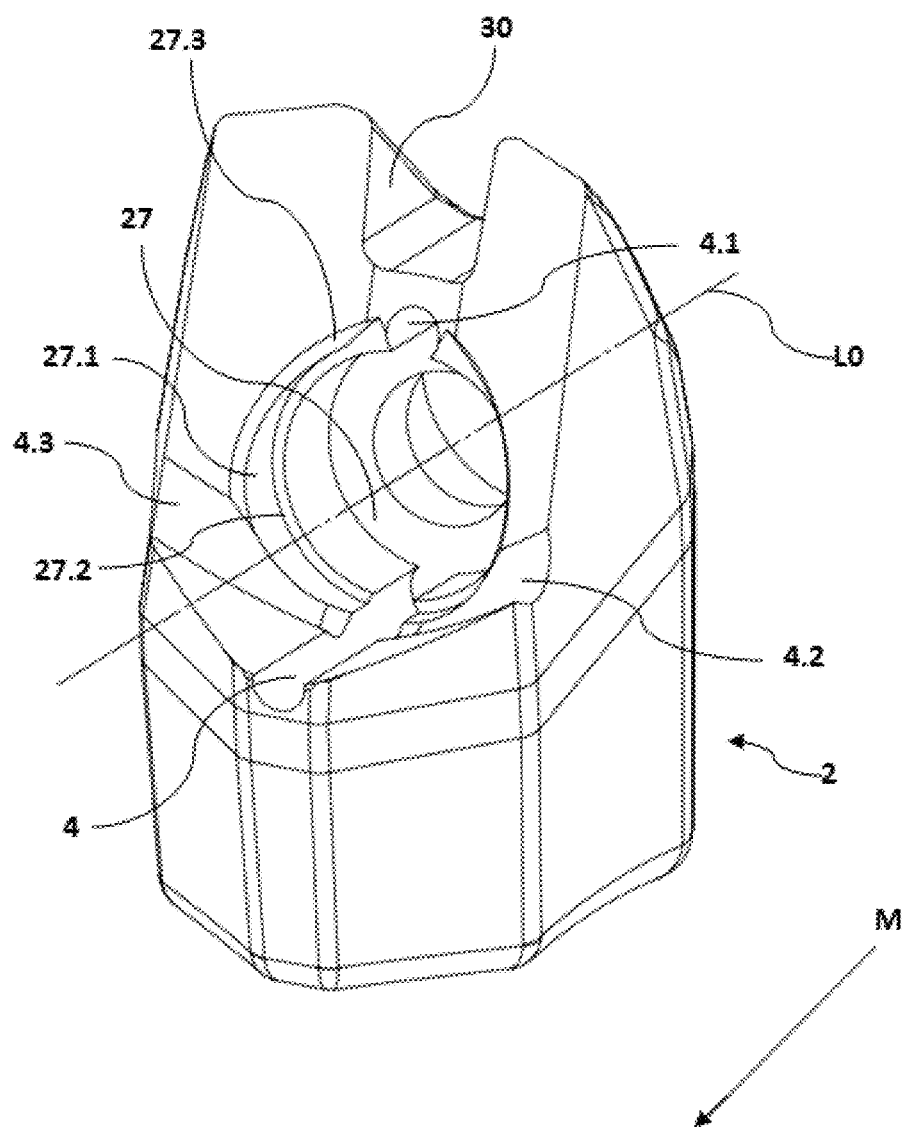
FIG. 23 is an axial view of a base from the perspective of a work direction in an exemplary embodiment of the present invention.
Figure 24:
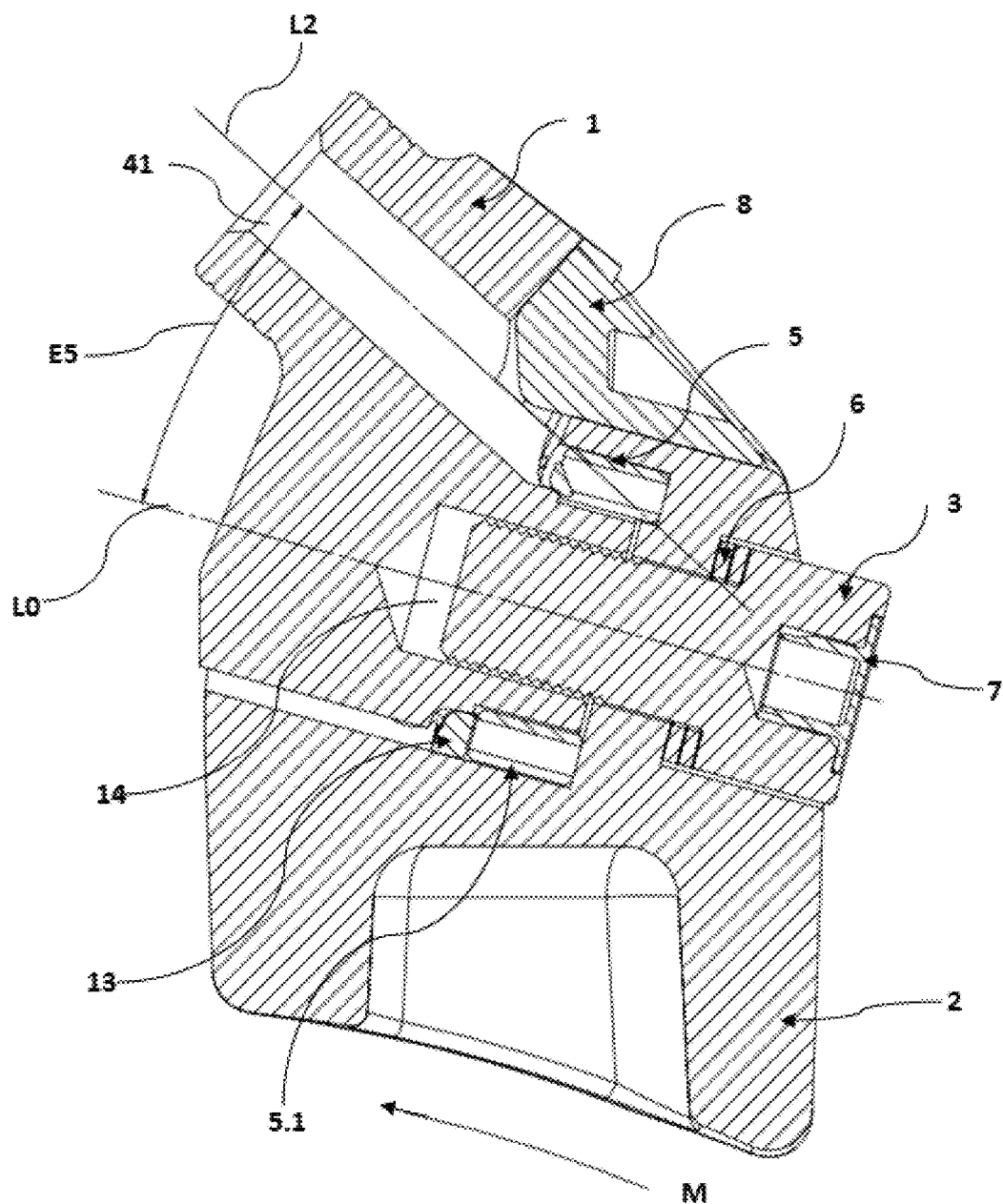
FIG. 24 is a sectional view of a general assembly diagram of a cutter holder and base system in an exemplary embodiment of the present invention.
Figure 25:
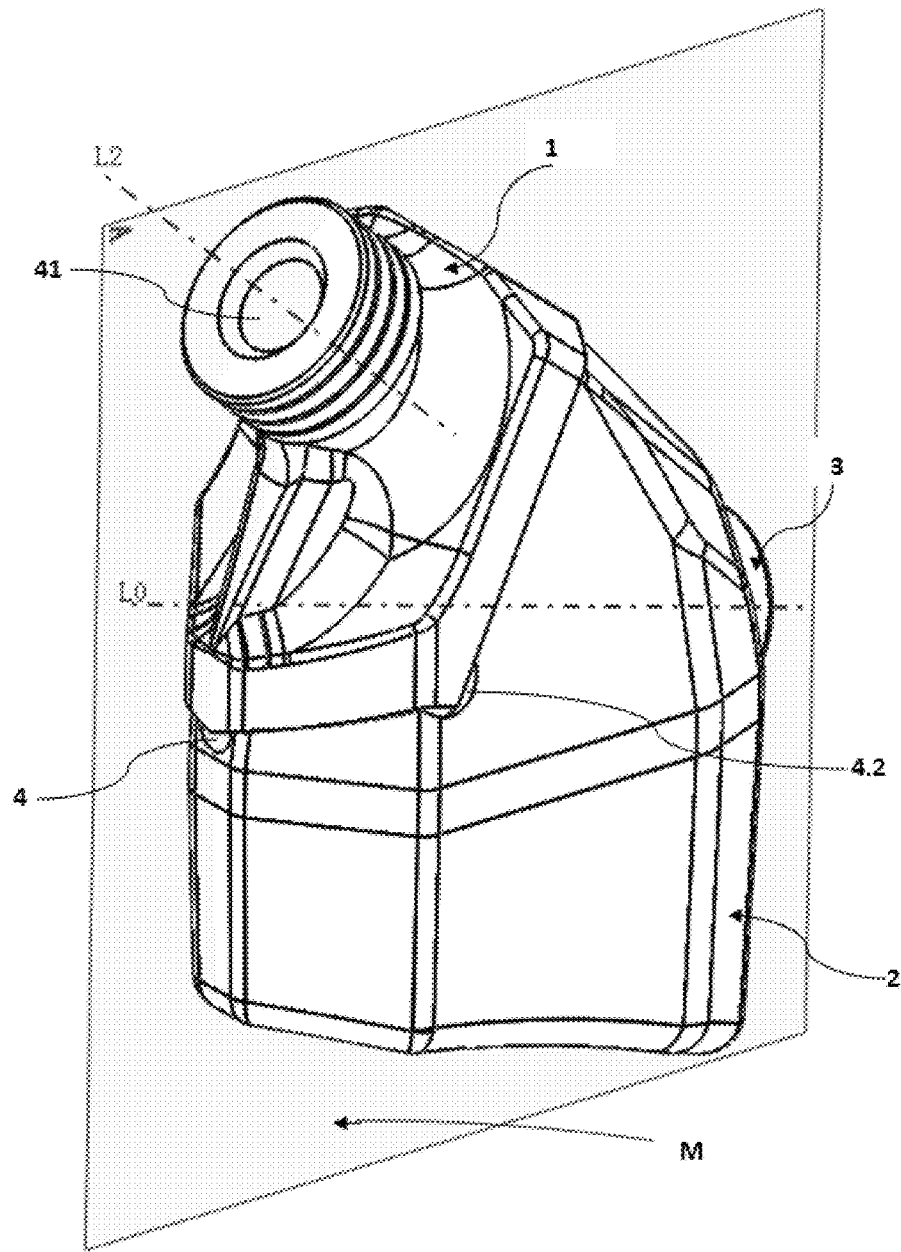
FIG. 25 is an axonometric drawing of a general assembly diagram of a cutter holder and base system in an exemplary embodiment of the present invention.
Figure 26:
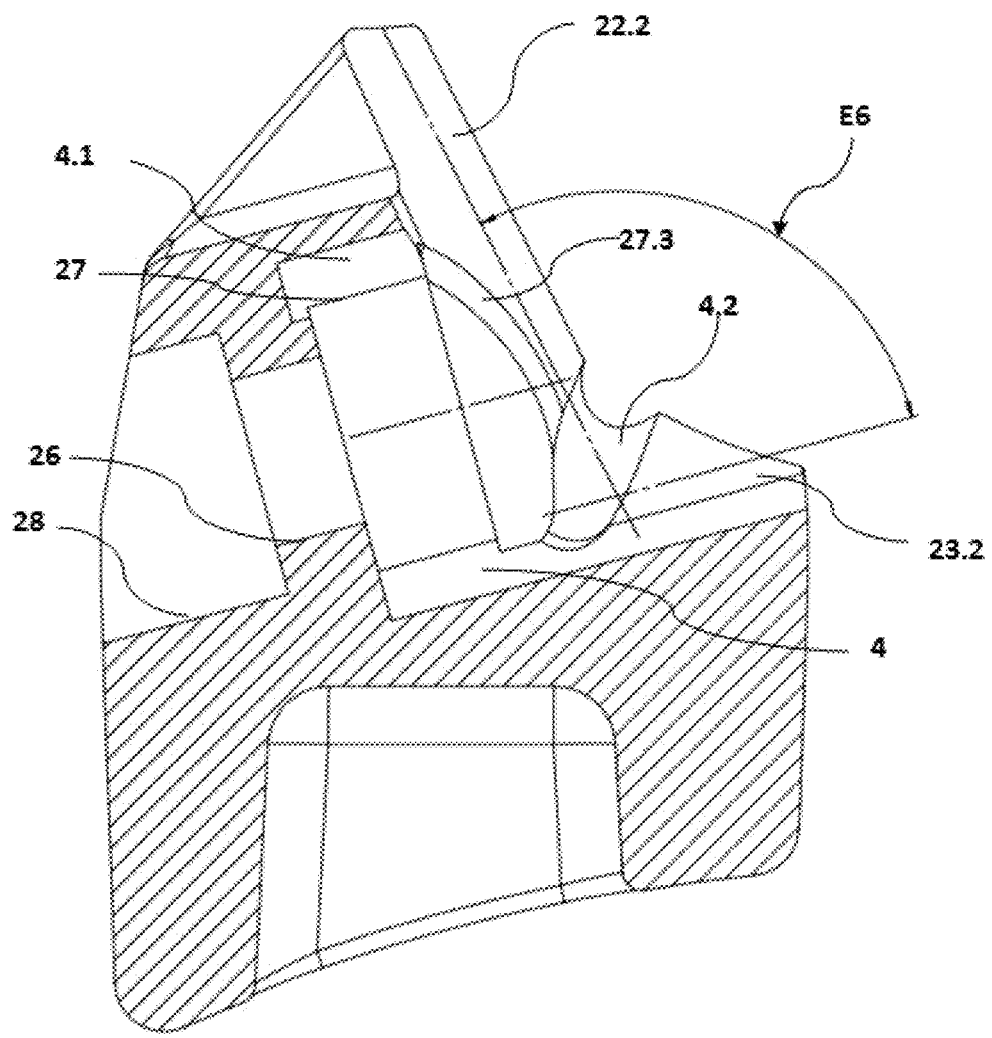
FIG. 26 is a cross-sectional view of a base along a plane A in an exemplary embodiment of the present invention.

The specific embodiments of the present invention are described in further detail below with reference to the accompanying drawings.

A novel cutter holder and base system for a milling machine according to this embodiment includes a bolt 3, a lock washer 6, a cutter holder 1 and a base 2, where the base 2 is provided with a hole-shaped inner area 21, a curved surface area 22 and a curved surface area 23; the curved surface area 22 and the curved surface area 23 are disposed in a circumferential area of the hole-shaped inner area 21 and are arranged at an angle E6 which is 120 degrees; the curved surface area 22 includes a curved surface 22.1 and a curved surface 22.2, and the curved surface area 23 includes a curved surface 23.1 and a curved surface 23.2. The cutter holder 1 is provided with a first matching curved surface area 12 and a second matching curved surface area 40 which are matched with the curved surface area 23 and the curved surface area 22 respectively, where the second matching curved surface area 40 is provided with a corresponding bearing curved surface 40.1 and a corresponding bearing curved surface 40.2 which support the curved surface 22.1 and the curved surface 22.2 respectively; the first matching curved surface area 12 is provided with a corresponding bearing curved surface 12.1 and a corresponding bearing curved surface 12.2 which support the curved surface 23.1 and the curved surface 23.2 respectively. The cutter holder 1 is provided with a cutter mounting hole 41 extending toward the mounting side and a fixing portion 11 extending toward the supporting side, and the fixing portion 11 is inserted in the inner area 21. A clamping table 26 is disposed on an inner wall of the inner area 21 of the base 2, and the clamping table 26 divides the inner area 21 into a hole-shaped chamber 27 for accommodating the fixing portion 11 and a hole-shaped accommodating chamber 28 for accommodating the bolt 3 and the lock washer 6.

The fixing portion 11 is provided with an internally threaded hole, and one end of a screw 3.2 of the bolt 3 passes through a center hole 6.1 of the lock washer 6 and is screwed into the internally threaded hole (14) of the fixing portion (11) to tightly connect the cutter holder 1, the lock washer 6 and the base 2 into a whole. A rubber tail cover 7 is arranged inside the tail 3.1 of the bolt 3.

A central axis of the fixing portion is collinear with a central axis L0 of the inner area 21, and in a virtual plane A formed by the central axis L0 and a central axis L2 of the cutter mounting hole, the central axis L0 and the central axis L2 form a certain angle ranging from 27 degrees to 30 degrees.

The intersection of the curved surface area 23 and the curved surface area 22 is in transition connection through a recessed transition curved surface 4.2 and a recessed transition curved surface 4.3.

The curved surface area 22 and the inner area 21 are transitionally adjacent to each other through a concave annular groove 27.3.

The curved surface 22.1 and the curved surface 22.2 are in transition connection through a curved surface 39, and the curved surface 23.1 and the curved surface 23.2 are in transition connection through a semi-circular groove 4.

The curved surface 22.1 and the curved surface 22.2 are symmetric with respect to a center line L1 of the inner area 21, and the curved surface 23.1 and the curved surface 23.2 are symmetric with respect to a center line L1 of the inner area 21.

The curved surface 22.1 and the curved surface 22.2 described in this embodiment are both rotating surfaces. A tangent 35 of the curved surface 22.1 and a tangent 36 of the curved surface 22.2 are symmetric with respect to the center line L1 of the inner area 21, and an included angle between the tangent 35 and the tangent 36 ranges from 110 degrees to 120 degrees; the radius of the curved surface 22.1 is in the range of R200-R230, and an offset distance D5 of a center point O5 of the curved surface 22.1 relative to the center line L1 is 86 mm; the radius of the curved surface 22.2 is within the range of R200-R230, and an offset distance D6 of a center line point O6 of the curved surface 22.2 relative to the center line L1 is in the range of 85 mm to 89 mm.

The curved surface 23.1 and the curved surface 23.2 described in this embodiment are both rotating surfaces. A tangent 37 of the curved surface 23.1 and a tangent 38 of the curved surface 23.2 are symmetric with respect to the center line L1 of the inner area 21, and an included angle between the tangent 37 and the tangent 38 ranges from 110 degrees to 120 degrees, the radius of the curved surface 23.1 is in the range of R200-R230, and an offset distance D7 of a center point O7 of the curved surface 22.1 relative to the center line L1 is 86 mm; the radius of the curved surface 23.2 is within the range of R200, and an offset distance D8 of a center line point O8 of the curved surface 22.2 relative to the center line L1 is in the range of 85 mm to 89 mm.

The inner wall of the hole-shaped chamber 27 is provided with a semi-circular groove 4 and a semi-circular groove 4.1, and a semi-circular fixing portion groove 29 and a semi-circular fixing portion groove 29.1 are formed in the corresponding positions of the outer wall of the fixing portion 11 of the cutter holder 1; the groove 4.1 and the groove 4 are axially parallel to the axis L0 and intersect with the center line L1, and the semi-circular groove 4 is combined with the semi-circular groove 29 to form a complete cylindrical groove; and the semi-circular groove 4.1 is combined with the semi-circular groove 29.1 to form a complete cylindrical groove.

The cylindrical groove is provided with a C-shaped swell pin 5, and each notch of the C-shaped swell pin 5 is toward the inner area 21.

A rubber seal ring 13 is mounted in the hole-shaped chamber 27 and is provided with a yielding hole through which the fixing portion passes 11. The fixing portion 11 passes through the central hole of the rubber seal ring 13 and is inserted into the hole-shaped chamber 27.

A dust plug 8 is arranged in a top groove 30 of the base 2.

The accompanying drawings of the present embodiments are in a very simplified form and use non-precise ratios, and are merely used for convenient and clear auxiliary description of the embodiments of the present invention.

We claim:

1. A cutter holder and base system for a milling machine, comprising a cutter holder and a base,
    wherein the base is provided with a hole-shaped inner area, a first curved surface area and a second curved surface area;
    the first curved surface area and the second curved surface area are disposed in a circumferential area of the hole-shaped inner area and are arranged at an angle formed by the second curved surface area and the first curved surface area;
    the first curved surface area comprises a first curved surface and a second curved surface, and the second curved surface area comprises a third curved surface and a fourth curved surface,
wherein the second curved surface area and the first curved surface area are adjacent to a first transition curved surface and a second transition curved surface, the first and second transition curved surfaces being located between the first and second curved surface areas, and wherein a first main longitudinal axis of the first transition curved surface and a second main longitudinal axis of the second transition curved surface form a nonzero angle.

2. The cutter holder and base system for a milling machine according to claim 1, wherein the angle formed by the second curved surface area and the first curved surface area is 110-120 degrees.

3. The cutter holder and base system for a milling machine according to claim 1, wherein the first curved surface area and the inner area are adjacent to a concave annular groove, the concave annular groove being located between the first curved surface area and the inner area.

4. The cutter holder and base system for a milling machine according to claim 1, wherein the first curved surface and the second curved surface are symmetric with respect to a center line of the inner area, and the third curved surface and the fourth curved surface are symmetric with respect to the center line of the inner area.

5. The cutter holder and base system for a milling machine according to claim 4,
    wherein a first tangent of the first curved surface and a second tangent of the second curved surface are symmetric with respect to the center line of the inner area, and an included angle between the first tangent and the second tangent ranges from 110 degrees to 120 degrees;
    a first offset distance of a first center point of curvature of the first curved surface relative to the center line is in the range of 85 mm to 89 mm;
    a second offset distance of a second center line point of curvature of the second curved surface relative to the center line is in the range of 85 mm to 89 mm.

6. The cutter holder and base system according to claim 1,
    wherein a third tangent of the third curved surface and a fourth tangent of the fourth curved surface are symmetric with respect to a center line of the inner area, and an included angle between the third tangent and the fourth tangent ranges from 110 degrees to 120 degrees;
    a third offset distance of a third center line point of curvature of the first curved surface relative to the center line is in the range of 85 mm to 89 mm;
    a fourth offset distance of a fourth center line point of curvature of the fourth curved surface relative to the center line is in the range of 85 mm to 89 mm.

7. The cutter holder and base system according to claim 1,
    wherein the cutter holder is provided with a first matching curved surface area and a second matching curved surface area which are matched with the second curved surface area and the first curved surface area respectively,
    wherein the second matching curved surface area is provided with a corresponding first bearing curved surface and a corresponding second bearing curved surface which support the first curved surface and the second curved surface respectively; and
    the first matching curved surface area is provided with a corresponding third bearing curved surface and a corresponding fourth bearing curved surface which support the third curved surface and the fourth curved surface respectively.

8. The cutter holder and base system according to claim 1, wherein the cutter holder is provided with a cutter mounting hole extending toward a mounting side of the cutter holder and a fixing portion extending toward a supporting side of the cutter holder, and the fixing portion is inserted in the inner area.

9. The cutter holder and base system according to claim 8, wherein a first central axis of the fixing portion is collinear with a second central axis of the inner area, and in a virtual plane formed by the second central axis and a third central axis of the cutter mounting hole, the second central axis and the third central axis form an angle ranging from 27 degrees to 30 degrees.

10. The cutter holder and base system for a milling machine according to claim 8, further comprising a bolt and a lock washer, the fixing portion is provided with an internally threaded hole, and one end of a screw of the bolt passes through a center hole of the lock washer and is screwed into the internally threaded hole of the fixing portion to tightly connect the cutter holder, the lock washer and the base into a whole.

11. The cutter holder and base system for a milling machine according to claim 1, wherein respective upper curved edges of the first and second transition curved surfaces are concentric with the hole-shaped inner area.

* * * * *